US012770480B2

(12) United States Patent
Chawda et al.

(10) Patent No.: US 12,770,480 B2
(45) Date of Patent: Oct. 20, 2026

(54) AIRFIELD LUMINAIRE OBSTRUCTION DETECTION

(71) Applicant: Honeywell International Inc., Charlotte, NC (US)

(72) Inventors: Nipun Kumar Chawda, Bangalore (IN); Karunakar Mahadevappa Kamadolli, Dharwad (IN); Inayat Nandihalli, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 112 days.

(21) Appl. No.: 18/369,384

(22) Filed: Sep. 18, 2023

(65) Prior Publication Data

US 2025/0095463 A1 Mar. 20, 2025

(51) Int. Cl.

| | |
|---|---|
| ***G08B 13/18*** | (2006.01) |
| ***B64F 1/20*** | (2006.01) |
| ***G08B 13/183*** | (2006.01) |
| ***G08G 5/51*** | (2025.01) |

(52) U.S. Cl.

CPC .............. *G08B 13/183* (2013.01); *B64F 1/20* (2013.01); *G08G 5/51* (2025.01); *B64D 2203/00* (2013.01)

(58) Field of Classification Search

CPC ........... G08B 13/183; B64F 1/20; G08G 5/51; B64D 2203/00

See application file for complete search history.

(56) References Cited

U.S. PATENT DOCUMENTS

| | | | | |
|---|---|---|---|---|
| 7,262,388 | B2 * | 8/2007 | Moreth | B60Q 1/0017 362/311.06 |
| 8,563,898 | B1 | 10/2013 | Wright et al. | |
| 9,829,191 | B2 | 11/2017 | Gongola et al. | |
| 2010/0206865 | A1 * | 8/2010 | Jaccard | A47J 31/44 219/438 |
| 2013/0094192 | A1 | 4/2013 | De Boeck et al. | |
| 2014/0268647 | A1 | 9/2014 | Blondin et al. | |
| 2015/0055363 | A1 | 2/2015 | Van Straten | |
| 2019/0385025 | A1 * | 12/2019 | McMichael | G06V 10/82 |
| 2020/0187307 | A1 * | 6/2020 | Pizzi | H05B 3/03 |
| 2021/0033263 | A1 * | 2/2021 | Moghal | F21V 15/00 |
| 2021/0280040 | A1 * | 9/2021 | Chawda | G01M 5/0066 |

FOREIGN PATENT DOCUMENTS

| | | | |
|---|---|---|---|
| EP | 1809074 | B1 | 5/2011 |
| EP | 2196732 | B1 | 8/2015 |
| WO | 2023081002 | A2 | 5/2023 |

* cited by examiner

*Primary Examiner* — Davetta W Goins
*Assistant Examiner* — Sharmin Akhter
(74) *Attorney, Agent, or Firm* — Brooks, Cameron & Huebsch, PLLC

(57) ABSTRACT

Methods, devices, and systems for airfield luminaire obstruction detection are described herein. In some examples, one or more embodiments include a controller for airfield luminaire obstruction detection, comprising a memory, and a processor configured to execute instructions stored in the memory to receive a signal from a light sensor of an airfield luminaire, determine, based on the signal, whether a lens of the airfield luminaire is obstructed by debris, and activate, based on whether the lens is obstructed, at least one of a vibration mechanism of the airfield luminaire and a heating mechanism of the airfield luminaire based on a temperature of the airfield luminaire to aid in clearing the debris.

15 Claims, 5 Drawing Sheets

AIRFIELD LUMINAIRE OBSTRUCTION DETECTION

TECHNICAL FIELD

The present disclosure relates to methods, devices, and systems for airfield luminaire obstruction detection.

BACKGROUND

Airfield infrastructure can include terminals, hangars, maintenance facilities, etc. Airfields can further include runways, approach ways, taxiways, and/or intersections therebetween to direct aircraft traffic and/or other vehicles in and/or around the airfield.

Airfields can include lighting systems to provide visual cues and/or signals for an airfield. For example, airfield lighting systems can include luminaires in order to direct aircraft and/or other vehicles in and/or around the airfield. The airfield lighting systems may, in some instances, be mandated by regulatory bodies such as the International Civil Aviation Organization (ICAO) and/or Federal Aviation Administration (FAA), among other examples. Airfield lighting systems can provide a safe and efficient way to regulate airfield traffic.

DETAILED DESCRIPTION

Figure 1:
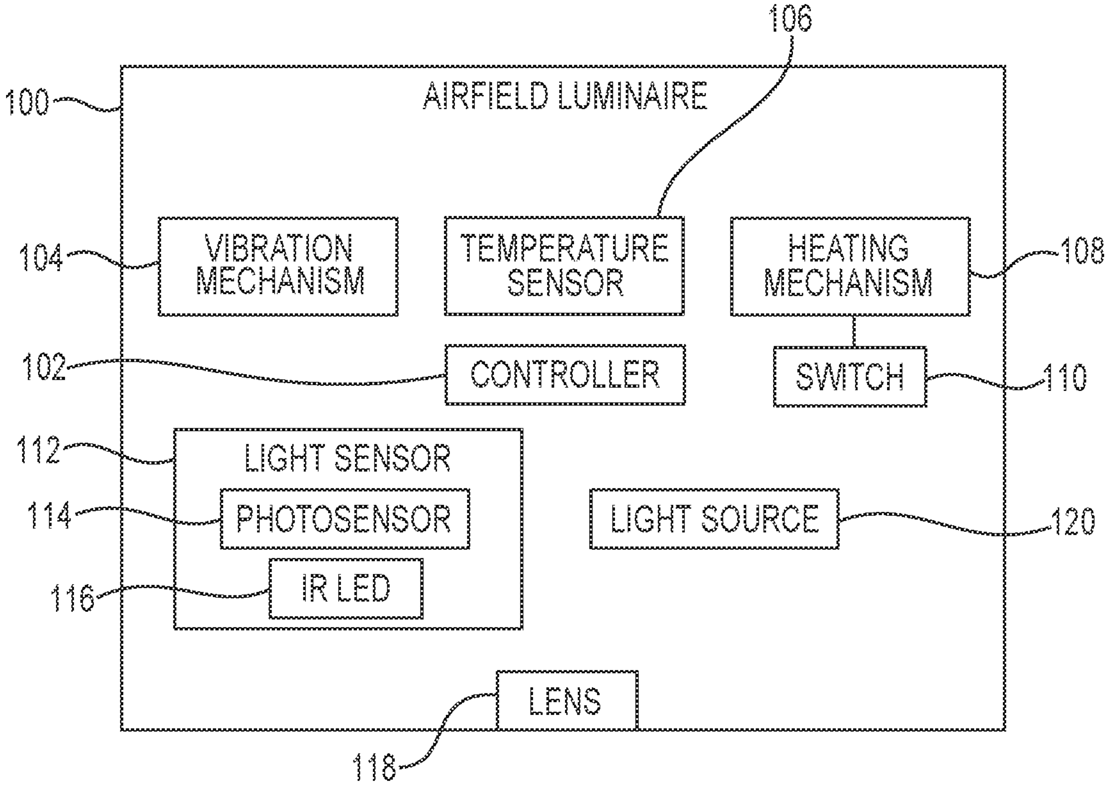
FIG. 1 is a block diagram of an example of an airfield luminaire 102 for airfield luminaire obstruction detection, in accordance with one or more embodiments of the present disclosure.

Methods, devices, and systems for airfield luminaire obstruction detection are described herein. In some examples, one or more embodiments include a controller for airfield luminaire obstruction detection, comprising a memory, and a processor configured to execute instructions stored in the memory to receive a signal from a light sensor of an airfield luminaire, determine, based on the signal, whether a lens of the airfield luminaire is obstructed by debris, and activate, based on whether the lens is obstructed, at least one of a vibration mechanism of the airfield luminaire and a heating mechanism of the airfield luminaire based on a temperature of the airfield luminaire to aid in clearing the debris.

Airfield luminaires can be located in, above, and/or around an airport surface. As used herein, the term "airfield luminaire" refers to a lighting unit including a light source and associated wiring. For example, airfield luminaires can include halogen and/or light emitting diode (LED) lamps and can be located around approach ways, mounted in the airport surface on runways, taxiways, intersections, etc.

The airfield luminaire can be, for instance, an inset luminaire. For example, the airfield luminaire can be installed within the pavement surface of the surface of the airfield. The inset airfield luminaires can provide guidance for aircraft during takeoff, landing, and ground movement (e.g., taxiing). The airfield luminaires can define the edges and/or a centerline of runways and/or taxiways, help pilots identify locations on the airfield, and/or give pilots directional information. Accordingly, airfield luminaires can help pilots safely navigate the airfield, especially during nighttime and/or during low visibility conditions.

Airfield luminaires can include a housing and can be mounted, via the housing, to a mounting location around the airfield. For example, an airfield luminaire can include a housing that can be connected to a base recessed into the runway, taxiway, intersections, etc. The housing can be connected to the base by bolts.

As airfield luminaires are located around airfields, they may be exposed to debris which can, in some instances, block the lens of the airfield luminaire such that light emitted by a light source of the airfield luminaire may be blocked, reducing or eliminating the light emitted from the airfield luminaire. Such debris can include dirt, sand, ice, snow, and/or rubber from tires of aircraft landing, taking off, taxiing, etc., among other types of debris.

When debris partially or fully blocks the light emitted from an airfield luminaire, a pilot may not be able to see the airfield luminaire. Accordingly, this blockage can prevent a pilot from safely navigating the airfield, as the pilot may not be able to easily determine directional information, identify locations on the airfield, and/or not be able to easily identify the edges and/or centerlines of runways/taxiways.

Accordingly, maintenance periods can be scheduled to ensure such airfield luminaires do not have debris causing a blockage of the light emission from the airfield luminaire. However, airfields may include many airfield luminaires. Clearing debris on these luminaires can be time consuming, costly, and expose maintenance personnel to injury. Additionally, flight activities may be temporarily suspended during debris clearance of airfield luminaires on the airfield, creating delays and/or increasing costs for airfields and/or airlines.

Airfield luminaire obstruction detection, in accordance with the present disclosure, can allow for remote monitoring of airfield luminaires for obstructions that may cause blockages of the light emitted from the airfield luminaires. Additionally, various mechanisms may be remotely and/or automatically activated to aid in clearing the debris from the airfield luminaires. Further, an alarm may be generated to notify a user of an obstruction from debris and the particular airfield luminaire having the obstruction, allowing for precise determination of obstructions and locations of luminaires having such obstructions. Accordingly, airfield luminaires can be individually determined for obstruction clearance, allowing for reduced maintenance time and increased safety for maintenance personnel, as well as an increase in efficiency of airport operations and reduction in costs as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designator "N", as used herein particularly with respect to reference numerals in the drawings, indicates that a number of the particular feature so designated can be included with a number of embodiments of the present disclosure. This number may be the same or different between designations.

FIG. 1 is a block diagram of an example of an airfield luminaire 100 for airfield luminaire obstruction detection, in accordance with one or more embodiments of the present disclosure. The airfield luminaire 100 can include a controller 102, a vibration mechanism 104, a temperature sensor 106, a heating mechanism 108, a switch 110, a light sensor 112, a lens 118, and a light source 120.

As previously described above, the airfield luminaire 100 can be an inset luminaire which can provide guidance for aircraft. Such guidance can assist a pilot of the aircraft during takeoff, landing, and/or ground movement (e.g., taxiing). The airfield luminaire 100 can provide guidance by utilizing a light source 120 to emit light from the airfield luminaire 100 through the lens 118. As used herein, the term "light source" refers to a device which generates light. The light source 120 can be, for example, a halogen lamp and/or a light emitting diode (LED), among other types of light sources 120. As used herein, the term "lens" refers to a transparent material through which light travels. For example, the lens 118 can be a transparent material through which light emitted by the light source 120 can travel. Accordingly, the light emitted by the light source 120 may travel through the lens 118 to exit the airfield luminaire 100 in order to be seen by a pilot or other person navigating the airfield.

As previously mentioned above, in some instances, debris can block the lens 118. For example, dirt, sand, ice, snow, and/or rubber from tires of aircraft landing, taking off, taxiing, etc. may be deposited in front of the lens 118, which can cause a partial or full blockage of the lens 118. In such a case, light emitted by the light source 120 may only partially visible or not visible at all by a person transiting the airfield. Accordingly, the airfield luminaire 100 can determine whether the lens 118 has an obstruction (e.g., debris) and utilize various mechanisms to aid in clearing the obstruction, as is further described herein.

In order to determine whether the lens 118 is obstructed by debris, a light sensor 112 can be utilized. As used herein, the term "sensor" refers to a device to detect events in its surrounding environment. For example, the light sensor 112 can be utilized to detect reflectance of a beam on any debris that might be located in front of the lens 118. To do this, the light sensor 112 can include a photosensor 114. As used herein, the term "photosensor" refers to a device that detects light and transmits an electrical signal in response to the detection of the light. Additionally, the light sensor 112 can include an infrared (IR) LED 116.

To determine whether the lens 118 is obstructed by debris, the IR LED 116 can generate and emit a beam. In some examples, the beam can be a pulsating beam. The beam generated by the IR LED 116 can be of a different wavelength than the light generated by the light source 120 such that the beam is not detectable in the spectrum band generated by the light source 120. The beam generated by the IR LED 116 can be directed at the lens 118. Accordingly, if debris is located in front of the lens 118, the beam is reflected back towards the photosensor 114. Upon detection of the beam by the photosensor 114, the photosensor 114 can transmit an electrical signal (e.g., a light signal) to the controller 102. In response to the amount of light of the beam that is reflected back to the photosensor 114 being greater than a threshold amount, the controller 102 can determine the lens 118 is obstructed by debris (e.g., indicating that a large portion of the beam contacted the debris and reflected instead of traveling out of the lens 118). Additionally, in response to the amount of light of the beam that is reflected back to the photosensor 114 being less than the threshold amount, the controller 102 can determine the lens 118 is not obstructed by debris (e.g., indicating that a large portion of the beam did not contact any objects located proximate to the lens 118 and instead of traveled out of the lens 118).

As mentioned above, the lens 118 may be partially or fully blocked by debris. In some examples, the controller 102 may utilize different thresholds to determine whether the lens 118 is partially or fully blocked. For example, the controller 102 can determine that in response to the amount of light of the beam that is reflected back to the photosensor 114 being greater than a first threshold amount but not greater than a second threshold amount (e.g., where the second threshold amount is greater than the first threshold amount), the lens 118 is partially obstructed by debris. Further, the controller 102 can determine that in response to the amount of light of the beam that is reflected back to the photosensor 114 being greater than a first threshold amount and greater than a second threshold amount (e.g., where the second threshold amount is greater than the first threshold amount), the lens 118 is fully obstructed by debris.

In order to aid in the clearing of such debris, the airfield luminaire 100 may utilize various mechanisms. For example, the airfield luminaire 100 may utilize the vibration mechanism 104 and/or the heating mechanism 108, as is further described herein.

As illustrated in FIG. 1, the airfield luminaire 100 can include a vibration mechanism 104. As used herein, the term "vibration mechanism" refers to a device that causes a mechanical oscillation. For example, the vibration mechanism 104 can be a solid-state piezo-based actuator. The vibration mechanism 104 can oscillate over a wide range of frequencies which can aid in breaking a bond between an outer housing of the airfield luminaire 100 and ice/snow/rubber. As a result, the vibration mechanism 104 can cause ice to crack and melt faster (e.g., along with heat generated by a heating mechanism 108, as is further described herein), and/or cause weak molecular bonded tire rubber particles to shake loose from the outer housing of the airfield luminaire 100. The airfield luminaire 100 may utilize the vibration mechanism 104 to vibrate loose debris that may be obstructing lens 118 under certain conditions, as is further described in connection with FIG. 2.

Additionally, the airfield luminaire 100 can include a temperature sensor 106 and a heating mechanism 108. As used herein, the term "temperature sensor" refers to a device that detects temperature and transmits an electrical signal in response to detection of the temperature. As used herein, the term "heating mechanism" refers to a device that generates heat. For example, the heating mechanism 108 can be a solid-state thick-film type resistor that can act as a resistive heater. The airfield luminaire 100 can utilize the heating mechanism 108 to generate heat in order to aid in melting debris such as ice and/or snow that may be obstructing lens 118 under certain conditions, as is further described in connection with FIG. 2.

The heating mechanism 108 can be switched on or off utilizing the switch 110. As used herein, the term "switch" refers to an electrical device that can disconnect or connect a conducting path in an electrical circuit. The switch 110 can be a solid-state alternating-current (AC) switch comprised of metal-oxide-semiconductor field-effect transistor(s) (MOSFET). The switch 110 can cause the heating mechanism 108 to turn on to generate heat when a temperature of the airfield luminaire 100 (e.g., determined by the temperature sensor 106) is below a certain threshold, and can shunt the heating mechanism 108 to turn the heating mechanism 108 off when the temperature of the airfield luminaire 100 is above a certain threshold, as is further described in connection with FIG. 2.

As described above, the vibration mechanism 104, the heating mechanism 108, and the switch 110 are described as solid-state devices. As used herein, the term "solid-state device" refers to a device that is semiconductor based. As previously mentioned above, the airfield luminaire 100 may be located on an area of the airfield which can expose the airfield luminaire 100 to forces from shocks and/or vibrations by aircraft landing, taking off, taxiing, etc. For instance, jet blasts from aircraft landing, taking off, and/or taxiing, and/or the weight of aircraft and/or other vehicles can generate vibrations that airfield luminaires may be exposed to. Such vibrations may cause damage to traditional devices utilized in previous approaches. For example, a heating element controlled by a mechanical bi-metal strip type thermostat utilized in previous approaches can have a limited operational life due to mechanical contacts utilized turning on and/or off, and can malfunction and/or break sooner because of vibrations caused by aircraft and/or other vehicles as described above. Accordingly, utilizing a solid-state vibration mechanism 104, solid-state heating mechanism 108, and solid-state switch 110 can prolong the life of such devices even under the vibrations caused by aircraft and/or other vehicles, as compared with previous approaches.

As illustrated in FIG. 1, the controller 102 can be included in the airfield luminaire 100. As mentioned above, the controller 102 can receive a signal (e.g., the light signal) from the light sensor 112, and determine based on the light signal from the light sensor 112 whether the lens 118 is obstructed by debris. Accordingly, the controller 102 can activate, based on whether the lens 118 is obstructed, the vibration mechanism 104 and/or the heating mechanism 108 to aid in clearing the debris, as is further described in connection with FIG. 2.

Figure 2:
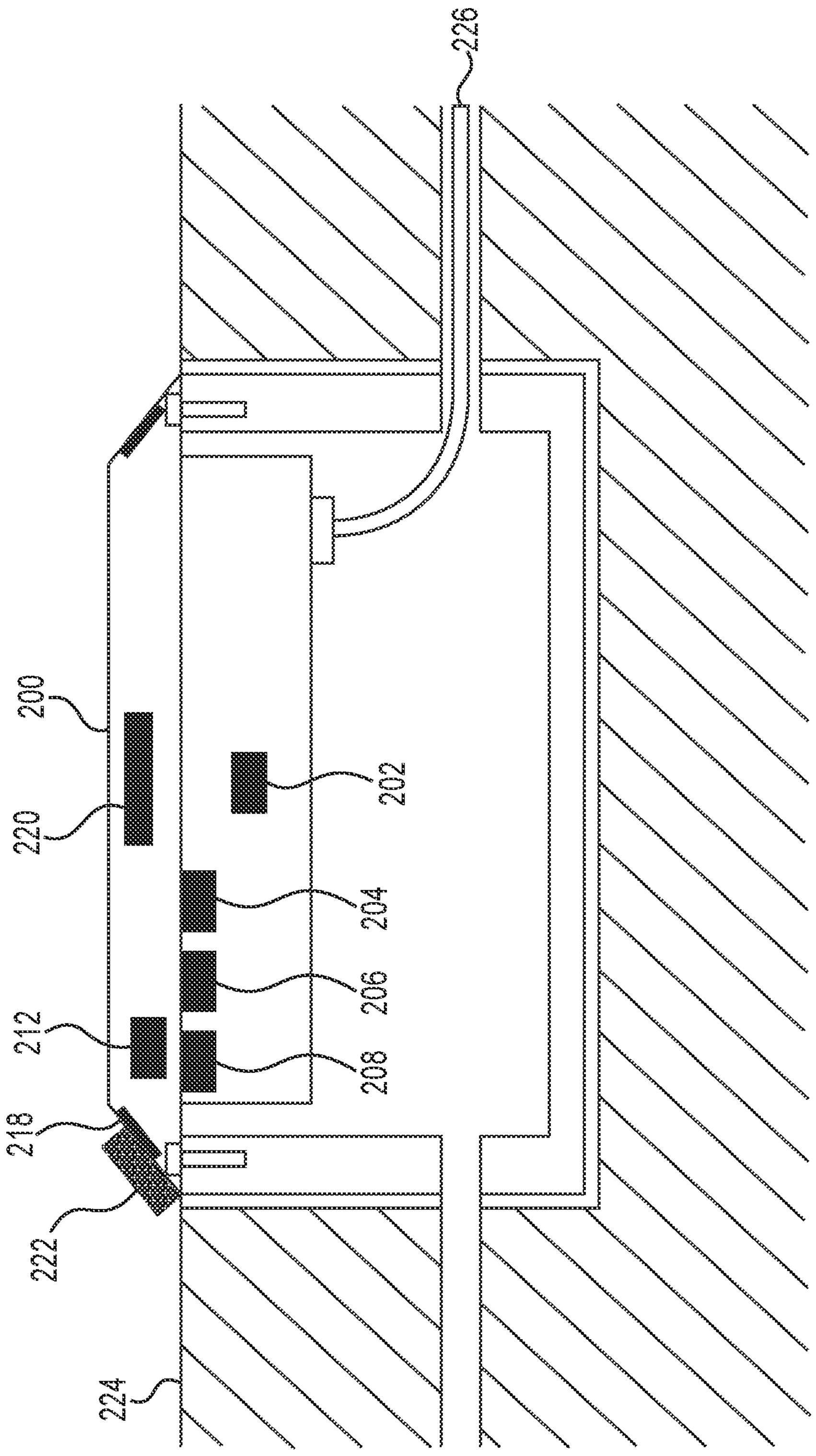
FIG. 2 is an example of an airfield luminaire inset in a surface of an airfield for airfield luminaire obstruction detection, the airfield luminaire having debris causing an obstruction, in accordance with one or more embodiments of the present disclosure.

FIG. 2 is an example of an airfield luminaire 200 inset in a surface 224 of an airfield for airfield luminaire obstruction detection, the airfield luminaire 200 having debris 222 causing an obstruction, in accordance with one or more embodiments of the present disclosure. As previously described in connection with FIG. 1, the airfield luminaire 200 can include a controller 202, a vibration mechanism 204, a temperature sensor 206, a heating mechanism 208, a light sensor 212, a lens 218, and a light source 220.

As previously described in connection with FIG. 1, the airfield luminaire 200 can be an inset luminaire. As illustrated in FIG. 2, the airfield luminaire 200 can be partially located under a surface 224 of the airfield. For example, the airfield luminaire 200 can include a housing which can include a casing and support for the light source 220, as well as associated wiring. As shown in FIG. 2, the airfield luminaire 200 can be connected to a power cable 226.

Although not illustrated in FIG. 2 for clarity and so as not to obscure embodiments of the present disclosure, the airfield luminaire 200 can be connected to an AC source regulator. As used herein, the term "AC source regulator" refers to a device that varies voltage across a load to maintain a constant electric current. For example, the AC source regulator can maintain a constant current in a range of 2.8 amperes (A) to 6.6 A to regulate luminaire light intensity. Additionally although not illustrated in FIG. 2 for clarity and so as not to obscure embodiments of the present disclosure, the airfield luminaire 200 can be connected to the AC source regulator via a series isolation transformer to prevent any breakage of electrical continuity between the airfield luminaire and the AC source regulator due to an open lamp condition in the airfield luminaire, as well as provide for galvanic isolation for safety, as is further described in connection with FIG. 4.

While the airfield luminaire 200 is partially located under the surface 224, a portion of the housing can be located above the surface 224 of the airfield. For example, the portion of the housing having the light source 220 and the lens 218 can be located above the surface 224 of the airfield such that light emitted by the light source 220 is visible to pilots and/or others navigating the airfield (e.g., when not obstructed by debris 222).

In order to aid in clearing the debris 222, the controller 202 can utilize a signal from the light sensor 212. As previously described in connection with FIG. 1, the light sensor 212 can utilize an IR LED to generate and emit a beam at the lens 218. As the debris 222 is located proximate to the lens 218 obstructing the lens 218, the beam can be reflected back towards a photosensor. As a result of the photosensor detecting the reflected beam, the light sensor 212 can transmit the signal to the controller 202.

The controller 202 can determine, based on the signal, whether the lens 218 is obstructed by the debris 222. For example, in response to the signal indicating that the amount of light of the beam reflected back to the photosensor is greater than a threshold amount, the controller 202 can determine the lens 218 is obstructed by debris.

The temperature sensor 206 can additionally take readings of the temperature of the airfield luminaire 200 and transmit the signal to the controller 202. Accordingly, the controller 202 can receive a temperature signal from the temperature sensor 206 and determine a temperature of the airfield luminaire 200 based on the temperature signal. For example, the controller 202 can determine the temperature of the airfield luminaire 200 to be 4 degrees Celsius (° C.). As another example, the controller 202 can determine the temperature of the airfield luminaire 200 to be 9° C. The controller 202 can activate both the vibration mechanism 204 and the heating mechanism 208, or only the vibration mechanism 204, based on the lens 218 being obstructed and based on the temperature of the airfield luminaire 200, as is further described herein.

As a first example, the controller 202 can determine the temperature of the airfield luminaire 200 to be 4° C. The controller 202 can compare the temperature of the airfield luminaire 200 (e.g., 4° C.) to a first threshold temperature (e.g., 5° C.), and determine that the temperature of the airfield luminaire 200 is less than the first threshold temperature. Accordingly, the controller 202 can activate, in response to the temperature of the airfield luminaire 200 being less than the first threshold temperature, the vibration mechanism 204 and the heating mechanism 208 to aid in clearing the debris 222. For example, the debris 222 may be ice, and the vibration mechanism 204, when activated, can cause cracks in the ice to form, allowing for heat generated by the heating mechanism 208 to melt the ice faster than non-cracked ice.

Additionally, the controller 202 can determine whether the lens 218 is obstructed by the debris 222 based on a further signal from the light sensor 212. For example, after a predetermined amount of time has passed, the light sensor 212 can again determine whether the lens 218 is obstructed by the debris 222. The controller 202 can accordingly deactivate the vibration mechanism 204 and the heating mechanism 208 in response to the further signal from the light sensor 212 indicating the lens 218 is not obstructed by the debris 222. For example, the vibration mechanism 204 may have cracked the ice sufficiently and the heating mechanism 208 melted the ice sufficiently such that the ice has dissipated and is no longer obstructing the lens 218. Accordingly, light from the light source 220 can again be emitted through the lens 218 as the debris 222 obstructing the lens 218 has been cleared.

As a second example, the controller 202 can determine the temperature of the airfield luminaire 200 to be 9° C. The controller 202 can compare the temperature of the airfield luminaire 200 (e.g., 9° C.) to a first threshold temperature (e.g., 5° C.), and determine that the temperature of the airfield luminaire 200 is greater than the first threshold temperature. Additionally, the controller 202 can compare the temperature of the airfield luminaire 200 (e.g., 9° C.) to a second threshold temperature (e.g., 8° C.), and determine that the temperature of the airfield luminaire 200 is greater than the second threshold temperature. Accordingly, the controller 202 can activate, in response to the temperature of the airfield luminaire 200 being greater than the first threshold temperature and the second threshold temperature, only the vibration mechanism 204 to aid in clearing the debris 222. For example, the debris 222 may be rubber, and the vibration mechanism 204, when activated, can assist in breaking the bond between the luminaire housing and the rubber. In this second example in which the temperature of the airfield luminaire 200 exceeds the first and the second threshold, the heating mechanism 208 may not be necessary to activate, since the ambient/outdoor temperature at the airfield may be high enough such that ice and/or snow formation does not occur.

Additionally, the controller 202 can determine whether the lens 218 is obstructed by the debris 222 based on a further signal from the light sensor 212. For example, after a predetermined amount of time has passed, the light sensor 212 can again determine whether the lens 218 is obstructed by the debris 222. The controller 202 can accordingly deactivate the vibration mechanism 204 in response to the further signal from the light sensor 212 indicating the lens 218 is not obstructed by the debris 222. For example, the vibration mechanism 204 may have weakened the bond between the rubber and the housing of the airfield luminaire 200 such that the rubber is able to be blown away from the lens 218 (e.g., via wind, brushing by a user, airflow caused by aircraft and/or other vehicles passing by, by other aircraft tires contacting the debris 222 and sweeping it away, etc.) and is no longer obstructing the lens 218. Accordingly, light from the light source 220 can again be emitted through the lens 218 as the debris 222 obstructing the lens 218 has been cleared.

In both of the two examples above, debris 222 was partially or fully obstructing the lens 218. If debris 222 is obstructing the lens 218 (e.g., either partially or fully, and no matter the temperature of the airfield luminaire 200), the controller 202 can generate and transmit an alert in response to the lens 218 being obstructed by the debris 222. The alert can be information indicating a fault with the airfield luminaire 200 and can include a unique address of the airfield luminaire 200. Such information can alert a user to the debris 222 and to which airfield luminaire 200 has the debris 222 obstructing the lens 218. This can allow for the user to determine the location of the airfield luminaire 200 on the airfield and, if necessary, dispatch a maintenance technician to clear the debris.

The controller 202 can transmit the alert on the power cable 226. For example, the power cable 226 can be a preexisting power cable 226 connected to the airfield luminaire 200 that, while providing power to the airfield luminaire 200 (e.g., via AC Mains), can also serve to transmit the alert to a remote computing device (e.g., not illustrated in FIG. 2). The remote computing device can be a central monitoring device, and can also transmit the alert to a mobile device (e.g., not illustrated in FIG. 2) of a user.

Figure 3:
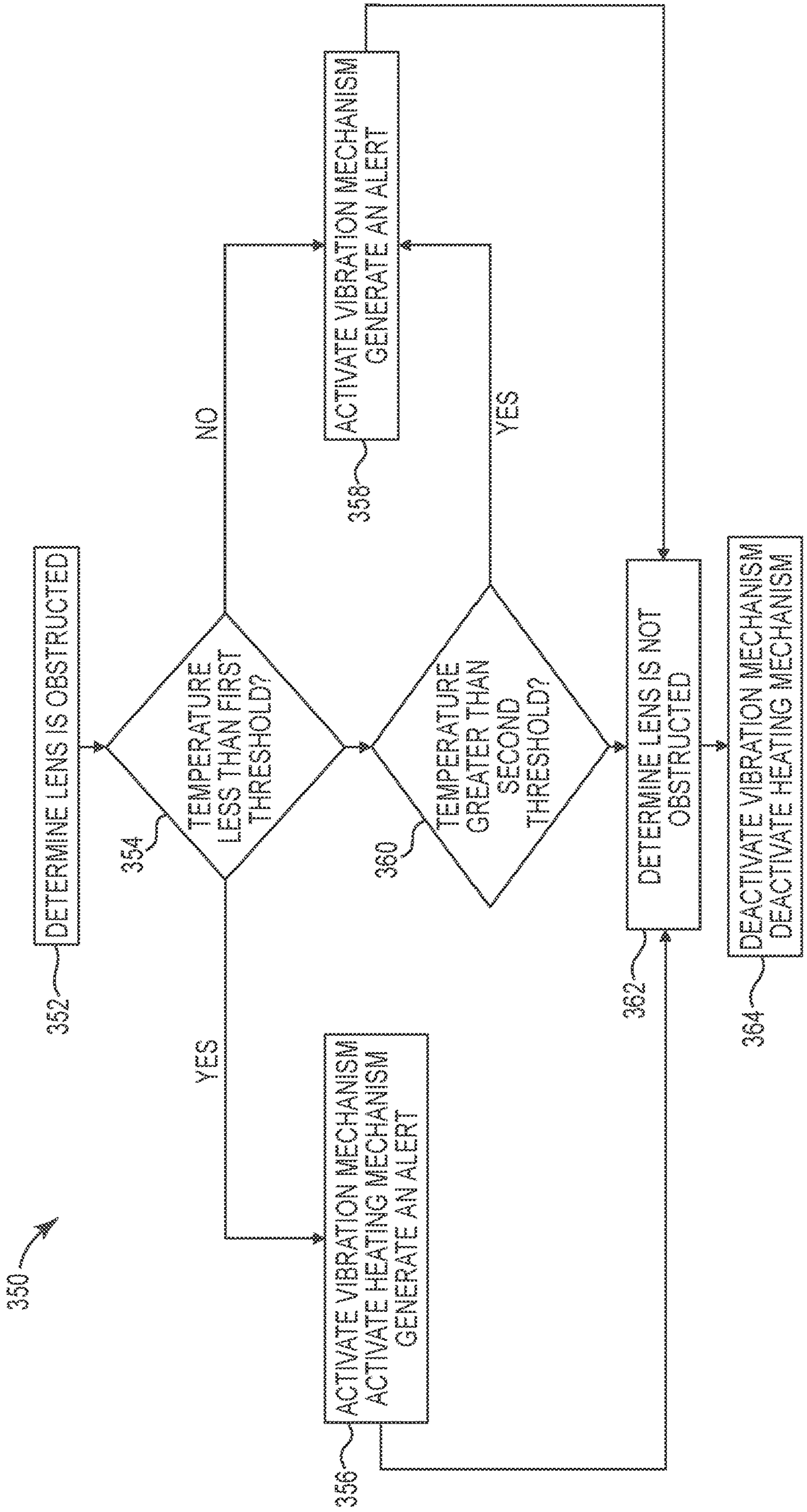
FIG. 3 is an example flow chart of a method for airfield luminaire obstruction detection, in accordance with one or more embodiments of the present disclosure.

FIG. 3 is an example flow chart 350 of a method for airfield luminaire obstruction detection, in accordance with one or more embodiments of the present disclosure. The method can be performed by, for example, a controller included in an airfield luminaire.

At 352, the controller can determine a lens of an airfield luminaire is obstructed. For example, a light sensor can be utilized to determine debris is obstructing the lens.

At 354, the controller can determine whether a temperature of the airfield luminaire is less than a first threshold temperature. The airfield luminaire can include a temperature sensor that can transmit a temperature signal to the controller. Based on the temperature signal, the controller can compare the temperature of the airfield luminaire to the first threshold temperature.

In response to the temperature of the airfield luminaire being less than the first threshold temperature, at 356, the controller can activate a vibration mechanism of the airfield luminaire and a heating mechanism of the airfield luminaire. Additionally, the controller can generate an alert and transmit the alert to notify a user of the obstruction in front of the lens. The vibration mechanism can break bonds with the debris in front of the lens, and if the debris is ice and/or snow, the heating mechanism can melt the ice and/or snow.

In response to the temperature of the airfield luminaire being greater than a first threshold temperature, at 360, the controller can determine whether a temperature of the airfield luminaire is greater than a second threshold temperature. Based on the temperature signal, the controller can compare the temperature of the airfield luminaire to the second threshold temperature. In response to the temperature of the airfield luminaire being greater than the first threshold temperature and greater than the second threshold temperature, at 358, the controller can activate only a vibration mechanism of the airfield luminaire (e.g., but not the heating mechanism of the airfield luminaire). Additionally, the controller can generate an alert and transmit the alert to notify a user of the obstruction in front of the lens. The vibration mechanism can break bonds with the debris in front of the lens. Since the temperature of the airfield luminaire is greater than the first and second threshold temperatures, it is unlikely the debris is ice and/or snow, and as such, it is not necessary to activate the heating mechanism.

At 362, the controller can determine the lens is not obstructed. For instance, in the first example, the vibration mechanism and the heating mechanism may have cleared the debris from the lens. In the second example, the vibration mechanism may have cleared the debris from the lens. Accordingly, at 364, the controller can deactivate the heating mechanism and the vibration mechanism, or deactivate the vibration mechanism.

Airfield luminaire obstruction detection, in accordance with the present disclosure, can allow for remote monitoring of airfield luminaires for obstructions that may cause blockages of the light emitted from the airfield luminaires, and remote activation of various mechanisms to aid in clearing the obstructions. Solid-state mechanisms can be utilized to improve performance and life-cycles of such mechanisms as compared to previous approaches. Accordingly, airfield luminaires can be individually determined for obstruction clearance, allowing for reduced maintenance time (e.g., and reduced airfield downtime) and increased safety for maintenance personnel, as well as an increase in efficiency of airport operations and reduction in costs as compared with previous approaches.

Figure 4:
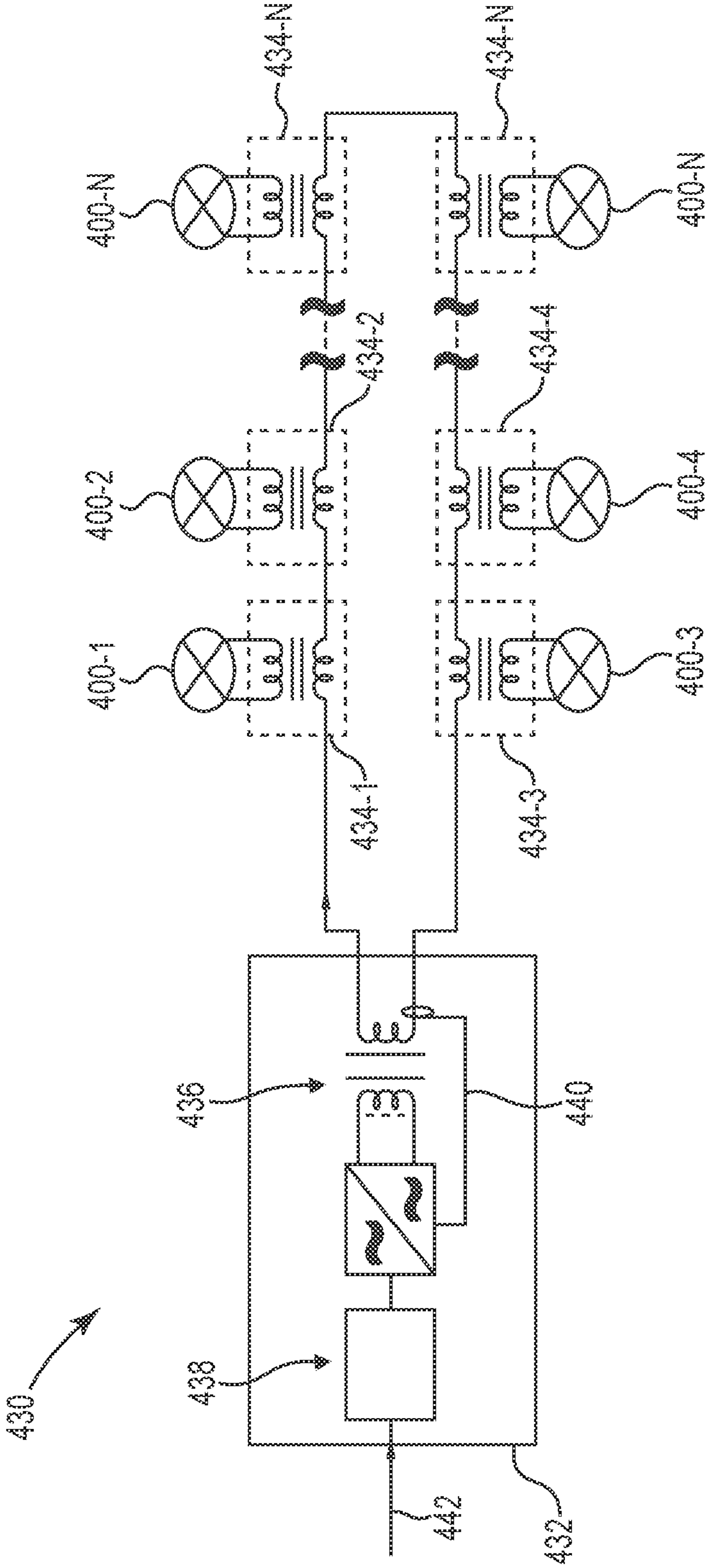
FIG. 4 is an example of an airfield ground lighting circuit for airfield luminaire obstruction detection, in accordance with one or more embodiments of the present disclosure.

FIG. 4 is an example of an airfield ground lighting circuit 430 for airfield luminaire obstruction detection, in accordance with one or more embodiments of the present disclosure. The airfield ground lighting circuit 430 can include an AC mains 442, a constant current regulator 432, airfield luminaires 400-1, 400-2, 400-3, 400-4, 400-N, and series isolation transformers 434-1, 434-2, 434-3, 434-4, 434-N. The constant current regulator 432 can include a power transformer 436, an input filter 438, and a feedback control 440.

As illustrated in FIG. 4, the airfield ground lighting circuit 430 can include airfield luminaires 400-1, 400-2, 400-3, 400-4, 400-N. The airfield luminaires 400-1, 400-2, 400-3, 400-4, 400-N can include a light source which can be utilized to direct aircraft and/or other vehicles in and/or around the airfield, as previously described in connection with FIGS. 1-3.

The airfield luminaires 400-1, 400-2, 400-3, 400-4, 400-N can be connected to the airfield ground lighting circuit 430 via series isolation transformers 434-1, 434-2, 434-3, 434-4, 434-N, respectively. As used herein, the term "series isolation transformer" refers to a device to transfer electrical power from a power source to a load. For example, the series isolation transformers 434-1, 434-2, 434-3, 434-4, 434-N can transfer electrical power from an AC mains 442 to each of the airfield luminaires 400-1, 400-2, 400-3, 400-4, 400-N, respectively.

As illustrated in FIG. 4, the airfield ground lighting circuit 430 can be connected to an AC mains 442. As used herein, the term "AC mains" refers to a power source to provide power to the airfield ground lighting circuit 430. The AC mains 442 can provide a 50 Hz/60 Hz AC power source in a range of 2.8 A to 6.6 A, although embodiments of the present disclosure are not limited to a 50 Hz/60 Hz AC power source and/or a range of 2.8 A to 6.6 A.

The AC mains 442 can provide power to the airfield ground lighting circuit 430 via the constant current regulator 432. As used herein, the term "constant current regulator" refers to a device to regulate an AC power source. For example, the constant current regulator 432 can regulate current from the AC mains 442 by providing current to the airfield ground lighting circuit 430 in the range of 2.8 A to 6.6 A, as well as provide isolation between the AC mains 442 and the rest of the airfield ground lighting circuit 430 in the event of an electrical power surge.

The constant current regulator 432 can include a power transformer 436. The power transformer 436 can isolate an AC signal (e.g., from the AC mains 442) from the airfield ground lighting circuit 430.

The power transformer 436 can be connected to an input filter 438. The input filter 438 can attenuate rippling that may occur as a result of the operation of the constant current regulator 432.

The constant current regulator 432 can include feedback control 440. The feedback control 440 can include a controller (not illustrated in FIG. 4 for clarity and so as not to obscure embodiments of the present disclosure) that can monitor an input current from the AC mains 442 to keep the input voltage and current of the AC signal in phase.

Figure 5:
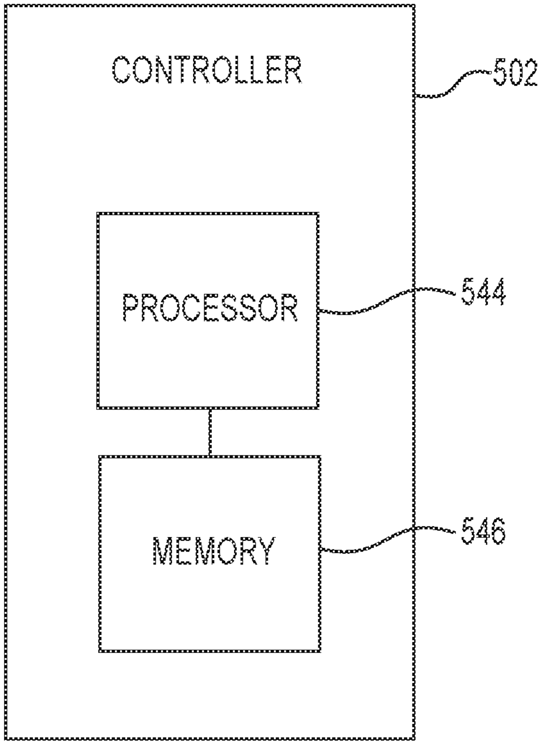
FIG. 5 is an example of a controller for airfield luminaire obstruction detection, in accordance with one or more embodiments of the present disclosure.

FIG. 5 is an example of a controller 502 for airfield luminaire obstruction detection, in accordance with one or more embodiments of the present disclosure. The controller 502 can include a processor 544 and a memory 546.

The memory 546 can be any type of storage medium that can be accessed by the processor 544 to perform various examples of the present disclosure. For example, the memory 546 can be a non-transitory computer readable medium having computer readable instructions (e.g., computer program instructions) stored thereon that are executable by the processor 544 for airfield luminaire obstruction detection in accordance with the present disclosure.

The memory 546 can be volatile or nonvolatile memory. The memory 546 can also be removable (e.g., portable) memory, or non-removable (e.g., internal) memory. For example, the memory 546 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 546 is illustrated as being located within the controller 502, embodiments of the present disclosure are not so limited. For example, memory 546 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A controller for airfield luminaire obstruction detection, comprising:
- a memory; and
- a processor configured to execute instructions stored in the memory to:
  - receive a signal from a light sensor of an airfield luminaire and a temperature signal from a temperature sensor of the airfield luminaire;
  - determine, based on the signal from the light sensor, whether a lens of the airfield luminaire is obstructed by debris;
  - determine, based on the temperature signal, a temperature of the airfield luminaire;
  - activate, based on whether the lens is obstructed, both a vibration mechanism of the airfield luminaire and a heating mechanism of the airfield luminaire based on the temperature of the airfield luminaire being less than a threshold temperature to aid in clearing the debris; and
  - activate, in response to the temperature of the airfield luminaire being greater than the threshold temperature, only the vibration mechanism to aid in clearing the debris.

2. The controller of claim 1, wherein the processor is configured to execute the instructions to:
- determine, based on a further signal from the light sensor, whether the lens is obstructed by the debris; and
- deactivate, in response to the further signal indicating the lens is not obstructed by the debris, the vibration mechanism and the heating mechanism.

3. The controller of claim 1, wherein the processor is configured to execute the instructions to:
- determine, based on a further signal from the light sensor, whether the lens is obstructed by the debris; and
- deactivate, in response to the further signal indicating the lens is not obstructed by the debris, the vibration mechanism.

4. The controller of claim 1, wherein the processor is configured to execute the instructions to generate and transmit an alert in response to the lens being obstructed by the debris.

5. The controller of claim 4, wherein the processor is configured to execute the instructions to transmit the alert on a preexisting power cable connected to the airfield luminaire.

6. The controller of claim 1, wherein the controller is included in the airfield luminaire.

7. An airfield luminaire for airfield luminaire obstruction detection, comprising:
- a lens;
- a temperature sensor;
- a light sensor;
- a vibration mechanism;
- a heating mechanism; and
- a controller configured to:
  - receive a signal from the light sensor and a temperature signal from the temperature sensor;
  - determine, based on the signal from the light sensor, whether the lens is obstructed by debris;
  - determine, based on the temperature signal, a temperature of the airfield luminaire;
  - activate, based on whether the lens is obstructed, both the vibration mechanism and the heating mechanism based on the temperature of the airfield luminaire being less than a threshold temperature to aid in clearing the debris; and
  - activate, in response to the temperature of the airfield luminaire being greater than the threshold temperature, only the vibration mechanism to aid in clearing the debris.

8. The airfield luminaire of claim 7, wherein the light sensor includes a photosensor and an infrared (IR) light emitting diode (LED) that emits a beam at the lens.

9. The airfield luminaire of claim 8, wherein the controller is configured to determine the lens is obstructed by the debris in response to an amount of light of the beam that is reflected back to the photosensor being greater than a threshold amount.

10. The airfield luminaire of claim 7, wherein the heating mechanism is a solid-state thick-film type resistor.

11. The airfield luminaire of claim 7, wherein the vibration mechanism is a solid-state piezo-based actuator.

12. The airfield luminaire of claim 7, wherein:
- the airfield luminaire is an inset luminaire that is partially located under a surface of an airfield; and
- the airfield luminaire further includes a light source to generate light through the lens, where the lens is located above the surface of the airfield.

13. A non-transitory computer readable medium having computer readable instructions stored thereon that are executable by a processor to:
- receive a light signal from a light sensor of an airfield luminaire and a temperature signal from a temperature sensor of the airfield luminaire, wherein the airfield luminaire is an inset airfield luminaire;
- determine:
  - a temperature of the airfield luminaire based on the temperature signal;
  - based on the light signal, whether a lens of the airfield luminaire is obstructed by debris;
- activate, based on whether the lens is obstructed, both a vibration mechanism of the airfield luminaire and a heating mechanism of the airfield luminaire based on the temperature of the airfield luminaire being less than a threshold temperature to aid in clearing the debris; and
- activate, in response to the temperature of the airfield luminaire being greater than the threshold temperature, only the vibration mechanism to aid in clearing the debris.

14. The medium of claim 13, wherein the instructions to determine whether the lens is obstructed include instructions executable by the processor to:

determine the lens is obstructed by the debris in response to light reflected to the light sensor being greater than a threshold amount; and determine the lens is not obstructed by the debris in response to light reflected to the light sensor being less than the threshold amount.

15. The medium of claim 13, wherein the computer readable instructions are executable by the processor to transmit a fault and a unique address of the airfield luminaire over a preexisting power cable.

* * * * *